(12) United States Patent
Masuda

(10) Patent No.: US 6,479,419 B2
(45) Date of Patent: Nov. 12, 2002

(54) ELECTRONIC DEVICE, DIELECTRIC CERAMIC COMPOSITION, AND METHOD FOR PRODUCING SAME

(75) Inventor: Takeshi Masuda, Tokyo (JP)

(73) Assignee: TDK Corporation, Tokyo (JP)

(*) Notice: Subject to any disclaimer, the term of this patent is extended or adjusted under 35 U.S.C. 154(b) by 173 days.

(21) Appl. No.: 09/741,161

(22) Filed: Dec. 21, 2000

(65) Prior Publication Data

US 2001/0006928 A1 Jul. 5, 2001

(30) Foreign Application Priority Data

Dec. 28, 1999 (JP) .......................... 11-373295
Nov. 13, 2000 (JP) ....................... 2000-345502

(51) Int. Cl.[7] .......................................... C04B 35/468
(52) U.S. Cl. ................... 501/138; 252/62.9 R
(58) Field of Search ................ 252/62.9 R, 62.9 PZ; 501/138

(56) References Cited

U.S. PATENT DOCUMENTS 5,221,872 A * 6/1993 Nishida et al. ........ 252/62.9 R
5,977,006 A * 11/1999 Iguchi et al. ............... 501/137
5,993,683 A * 11/1999 Hayashi et al. ....... 252/62.9 PZ

FOREIGN PATENT DOCUMENTS

| JP | 6-203630 | 7/1994 |
| JP | 6-342735 | 12/1994 |
| JP | 10-310469 | 11/1998 |
| JP | 10-330160 | 12/1998 |
| JP | 11-92220 | 4/1999 |

* cited by examiner

Primary Examiner—David Brunsman
(74) Attorney, Agent, or Firm—Oliff & Berridge, PLC

(57) ABSTRACT

A dielectric ceramic composition comprising as main components barium titanate and a component M (wherein M is at least one type of component selected from manganese oxide, iron oxide, cobalt oxide, and nickel oxide) and having a ferroelectric phase region, wherein the concentration of the component M in the ferroelectric phase region changes from the outside toward the center. The concentration of the component M in the ferroelectric phase region is higher at the outside compared with near the center of the ferroelectric phase region. It is possible to realize a multi-layer capacitor which can satisfy both of the X7R characteristic (EIA standard) and B characteristic (EIAJ standard) of the temperature characteristic of the electrostatic capacity, has little voltage dependency of the electrostatic capacity and the insulation resistance, is superior in insulation breakdown resistance, and can use Ni or a Ni alloy as the internal electrode layer.

20 Claims, 5 Drawing Sheets

○ SIX ANALYSIS POINTS BY TEM

100nm

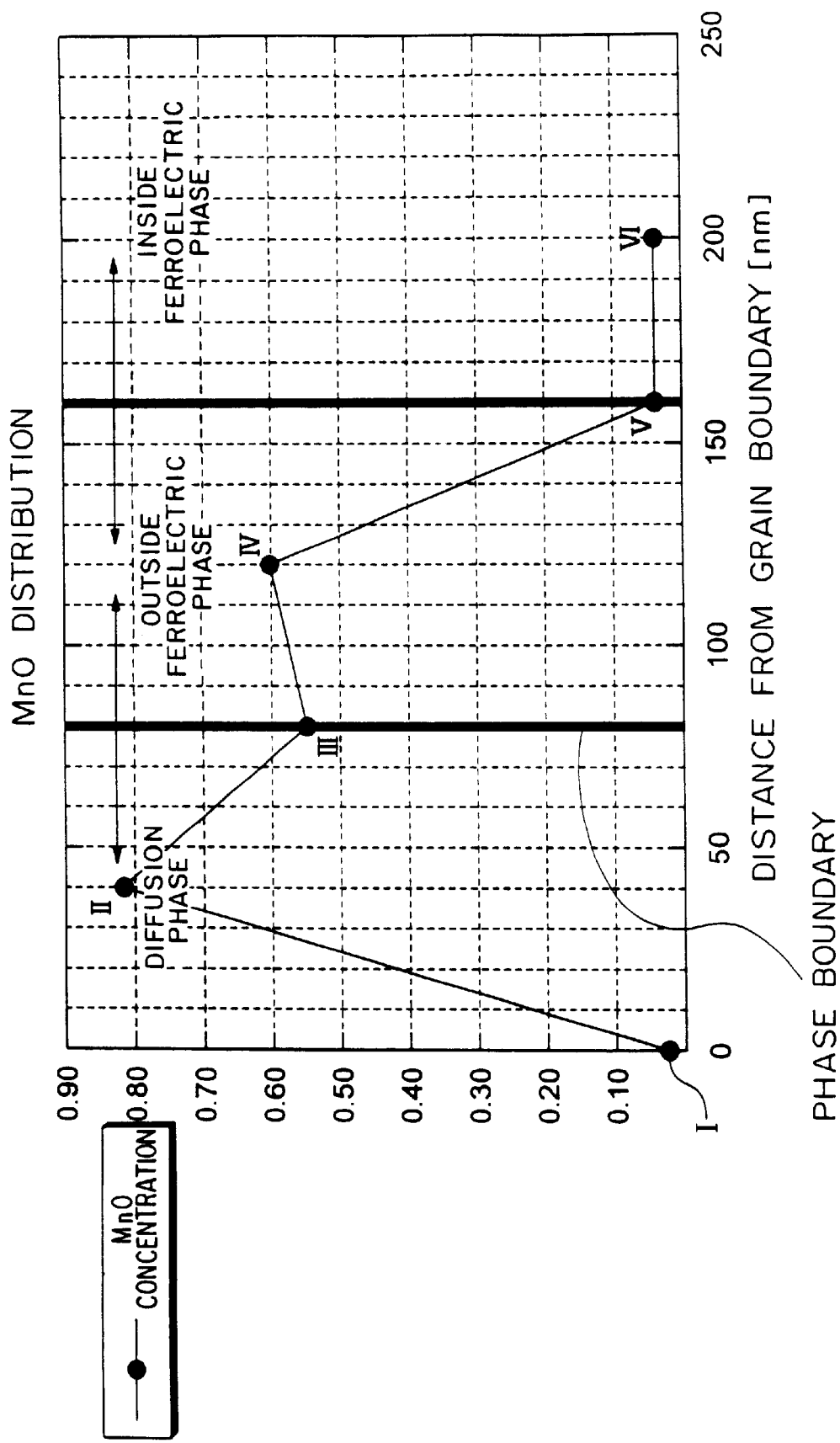

ELECTRONIC DEVICE, DIELECTRIC CERAMIC COMPOSITION, AND METHOD FOR PRODUCING SAME

BACKGROUND OF THE INVENTION

1. Field of the Invention

The present invention relates to a multi-layer capacitor or other electronic device, a dielectric ceramic composition suitable for use as the dielectric layer of the electronic device, and a method for producing the same.

2. Description of the Related Art

A multi-layer ceramic capacitor is being broadly used as a compact, large capacity, high reliability electronic device. The number used in each piece of electrical equipment and electronic equipment has also become larger. In recent years, along with the increasing miniaturization and improved performance of equipment, there have been increasingly stronger demands for further reductions in size, increases in capacity, reductions in price, and improvements in reliability in multi-layer ceramic capacitors.

One of the key technologies for reducing price is the use of the relatively inexpensive Ni or Ni alloys instead of use of the high priced Pd and Pd alloys for the internal electrodes. Further, the key technologies for the reduction of size and the increase in capacity are the reduction in thickness of the dielectric layer and the use of multiple layers.

If the thickness of the dielectric layer is reduced, the electric field intensity acting on the dielectric layer when a DC voltage is applied becomes larger. Along with this, the phenomenon of the reduction in the electrostatic capacity and the insulation resistance becomes remarkable—in particular in high dielectric constant dielectric ceramic compositions. From previous reports on the DC voltage dependency of the electrostatic capacity, that is, the DC bias, it is widely known to add to a main component of barium titanate, subcomponents such as $Bi_2O_3$, $TiO_2$, $SnO_2$, $ZrO_2$, and other compounds and rare earth elements. When a dielectric ceramic composition containing these compounds as subcomponents is used as the dielectric layers in a multilayer capacitor, however, the Pd of the internal electrode layer and the subcomponent compounds (for example, $Bi_2O_3$) react and the characteristics of the capacitor become insufficient. Therefore, it is necessary to use Pt or Au, which are both more expensive than Pd, for the internal electrode layers.

Further, as a dielectric ceramic composition not containing a compound such as $Bi_2O_3$, there are known dielectric ceramic compositions comprising a main component of barium titanate and subcomponents of $Nb_2O_5$, $Co_2O_3$, $Nd_2O_5$, $MnO_2$, and $SiO_2$ (Japanese Unexamined Patent Publication (Kokai) No. 6-203630). A multilayer capacitor using this dielectric ceramic composition as dielectric layers and using 30% Ag–70% Pd alloy as the internal electrodes has a temperature change of the electrostatic capacity TCC which satisfies the X7R characteristic and has a rate of change of the electrostatic capacity $\Delta C/C$ of within −30 percent when applying a DC bias field of 2 kV/mm. It is difficult to apply this dielectric ceramic composition, however, to a multi-layer capacitor using Ni as internal electrode layers.

Note that, as shown in Japanese Unexamined Patent Publication (Kokai) No. 10-330160, to improve the insulation breakdown voltage, there is known a barium titanate-based dielectric ceramic composition wherein Mn or another additive is substantially uniformly distributed in the entire region from the grain boundary to center of the crystal grain having a core-shell structure. In such a dielectric ceramic composition, however, the dielectric constant is insufficient and the temperature change of the electrostatic capacity TCC does not always satisfy the X7R characteristic of the EIA standard.

SUMMARY OF THE INVENTION

An object of the present invention is to provide an electronic device such as a multi-layer capacitor which can satisfy both of the X7R characteristic (EIA standard) and B characteristic (EIAJ standard) of the temperature characteristic of the electrostatic capacity, has little voltage dependency of the electrostatic capacity and the insulation resistance, is superior in insulation breakdown resistance, and can use Ni or a Ni alloy as the internal electrode layer, a dielectric ceramic composition suitable for use as the dielectric layer of such an electronic device, and a method of producing the same.

The present inventores engaged in intensive studies to achieve the object and as a result discovered that a dielectric ceramic composition comprised of barium titanate and a component M as main components and having a ferroelectric phase region in which the concentration of the component M in the ferroelectric phase region changes from the outside toward the center has superior properties and thereby completed the present invention.

That is, according to the present invention, there is provided a dielectric ceramic composition comprising as main components barium titanate and a component M (wherein M is at least one type of component selected from manganese oxide, iron oxide, cobalt oxide, and nickel oxide) and having a ferroelectric phase region, wherein the concentration of the component M in the ferroelectric phase region changes from the outside toward the center thereof.

The concentration of the component M in the ferroelectric phase region is preferably higher at the outside compared with near the center of the region.

The ferroelectric phase region is preferably comprised of an outside ferroelectric phase region and an inside ferroelectric phase region and has a higher concentration of the component M in the outside ferroelectric phase region than the inside ferroelectric phase region. In this case, more preferably, the inside ferroelectric phase region does not contain almost any of the component M.

In the dielectric ceramic composition of the present invention, generally there is a diffusion phase region outside of the ferroelectric phase region.

According to the present invention, there is provided a method of producing a dielectric ceramic composition comprising the steps of calcining barium titanate (A) and an ingredient of a component M (where M is at least one type of component selected from manganese oxide, iron oxide, cobalt oxide, and nickel oxide) and firing a mixture of the compound obtained in the calcination step and other barium titanate (B).

The temperature at the calcination is preferably 1000 to 1300° C.

The firing may be performed under a reducing atmosphere.

The molar ratio (M/A) of the component M to the pre-calcination barium titanate (A) is preferably 0.0010 to 0.0120, more preferably 0.0020 to 0.0080. Further, the molar ratio (B/A) of the later adding barium titanate (B) with respect to the pre-calcination barium titanate (A) is preferably 0.05 to 5.00, more preferably 0.10 to 1.00.

According to the present invention, there is provided an electronic device having a dielectric layer, wherein the dielectric layer is comprised of the above dielectric ceramic composition.

In the present invention, the "ferroelectric phase region" means the inside of a portion where a boundary is observed inside of a crystal grain when observing the microstructure of a dielectric ceramic composition by a transmission electron microscope (TEM). The ferroelectric property of barium titanate ($BaTiO_3$) is derived from the bipolar moment arising due to the displacement of the Ti ions. When atoms other than Ti atoms solidly dissolve into the barium titanate, the dielectric constant falls, the electrostatic capacity and the insulation resistance become blunted with respect to the voltage applied, and the ferroelectric property falls.

Therefore, the inside ferroelectric phase where the concentration of the component M is small contributes to an improvement of the dielectric constant, while the outside ferroelectric phase where the concentration of the component M is high has a small ferroelectric property. The ferroelectric region in the dielectric ceramic composition of the present invention is comprised of at least these two or more ferroelectric phases. As a result, it is possible to provide a dielectric ceramic composition having a high dielectric constant, a small temperature dependency of the electrostatic capacity, and small voltage dependencies of the electrostatic capacity and insulation resistance.

Note that when the concentration of the component M is relatively low and the component is uniformly distributed in the ferroelectric phase region, the dielectric ceramic composition has a larger dielectric constant, but there is the problem that the dielectric ceramic composition has a larger voltage dependency of the dielectric constant. Further, when the concentration of the component M is relatively high and the component is uniformly distributed in the ferroelectric phase region, the dielectric ceramic composition has a smaller voltage dependency, but also a lower dielectric constant.

BRIEF DESCRIPTION OF THE DRAWINGS

These and other objects and features of the present invention will be explained in further detail with reference to the attached drawings, in which:

FIG. 3 is a graph of the distribution of MnO in the ferroelectric phase region in the photograph shown in FIG. 2;

DESCRIPTION OF THE PREFERRED EMBODIMENTS

Multi-layer Ceramic Capacitor

Figure 1:
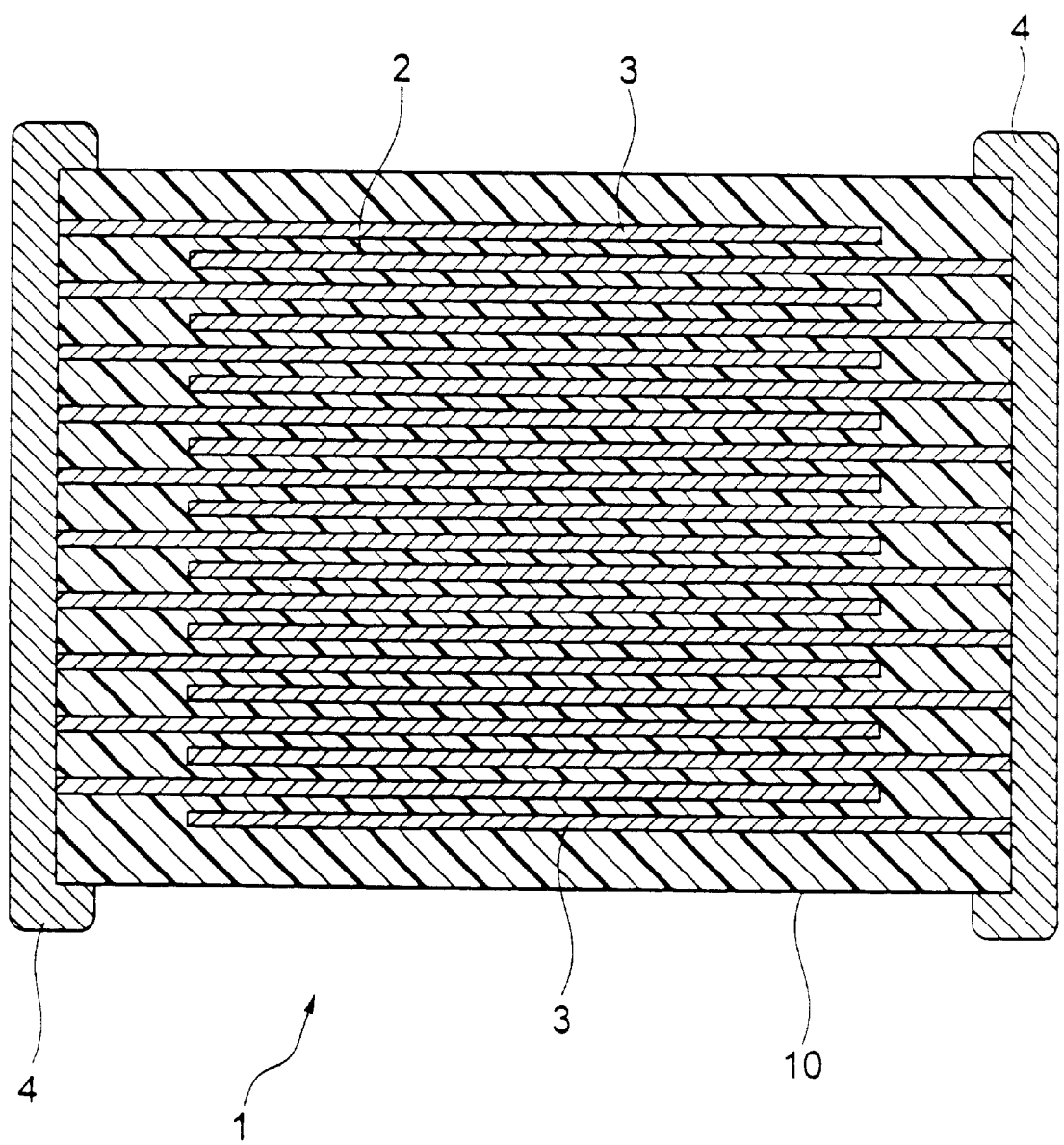
FIG. 1 is a sectional view of a multi-layer ceramic capacitor according to an embodiment of the present invention.

As shown in FIG. 1, a multi-layer ceramic capacitor 1 according to an embodiment of the present invention has a capacitor device body 10 of a configuration of dielectric layers 2 and internal electrode layers 3 stacked alternately. At the two ends of the capacitor device body 10 are formed a pair of external electrodes 4 conductive with the internal electrode layers 3 alternately arranged inside the device body 10. The shape of the capacitor device body 10 is not particularly limited, but normally is made a parallelopiped. Further, the dimensions are not particularly limited and may be made suitable dimensions in accordance with the application. Usually, however, they are (0.6 to 5.6 mm)×(0.3 to 5.0 mm)×(0.3 to 1.9 mm).

The internal electrode layers 3 are stacked so that end faces thereof alternately protrude out to the surfaces of the two opposing ends of the capacitor device body 10. The pair of external electrodes 4 are formed at the two ends of the capacitor device body 10 and are connected to the exposed end faces of the alternately arranged internal electrode layers 3, thereby constructing a capacitor circuit.

Dielectric Layers 2

Each of the dielectric layers 2 contains the dielectric ceramic composition of the present invention.

The dielectric ceramic composition of the present invention is a dielectric ceramic composition comprising as main components barium titanate ($BaTiO_3$) and a component M (wherein M is at least one type of component selected from manganese oxide (MnO), iron oxide (FeO), cobalt oxide (CoO), and nickel oxide (NiO)) and having a ferroelectric phase region, wherein the concentration of the component M in the ferroelectric phase region changes from the outside toward the center thereof.

Figure 2:
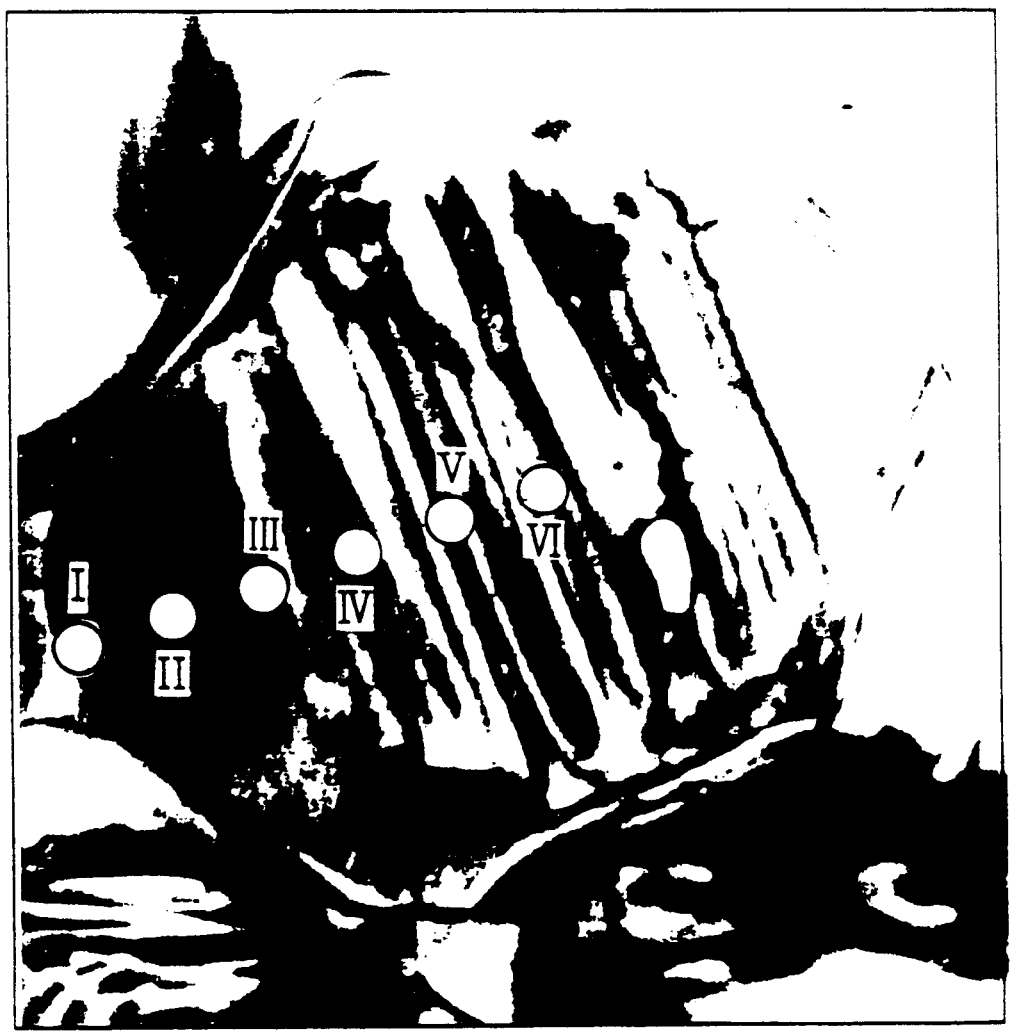
FIG. 2 is TEM photograph of a dielectric ceramic composition according to an example of the present invention.

For example, as shown in FIG. 2 and FIG. 3, the dielectric ceramic composition according to the present invention has a crystal grain comprised of a diffusion phase region and a ferroelectric phase region. The ferroelectric phase region is comprised of an outside ferroelectric phase region and an inside ferroelectric phase region. The dielectric ceramic composition of the embodiment shown in FIG. 2 and FIG. 3 is a dielectric ceramic composition comprised of barium titanate ($BaTiO_3$) and manganese oxide (MnO) as main components.

The grain boundary of the crystal grains are judged from the TEM photograph shown in FIG. 2 for example. Further, the phase boundary between the diffusion phase region and ferroelectric phase region is similarly judged from the TEM photograph. The phase boundary between the outside ferroelectric phase region and the inside ferroelectric phase region in the ferroelectric phase region cannot be judged from the TEM photograph shown in FIG. 2.

As shown in FIG. 2, six analysis points I to VI are taken from the grain boundary to center of a crystal grain and the concentration of MnO at each analysis point were measured. The results are shown in FIG. 3. As shown in FIG. 3, the ferroelectric phase region of the present embodiment changes in concentration of MnO from the outside to the center and further has a concentration of MnO increasing close to the phase boundary between the diffusion phase and ferroelectric phase region compared with close to the center of the region. Further, the ferroelectric phase region has an outside region which contains MnO and has this distribution of concentration and an inside region which does not include much MnO at all. The outside region will be referred to the "outside ferroelectric phase region" and the inside region will be referred to as the "inside ferroelectric phase region". The phase boundary between the outside ferroelectric phase region and inside ferroelectric phase region cannot be judged from the TEM photograph shown in FIG. 2.

In the composition of the present invention, the molar ratio (M/A+B) of the component M to the total barium titanate (A+B) in the composition is not particularly limited, but is preferably 0.0005 to 0.01, more preferably 0.001 to 0.007.

Further, the subcomponents which can be included in the composition according to the present invention are not particularly limited, but at least one type of oxide selected from MgO, CaO, BaO, SrO, and $Cr_2O_3$ and/or compounds forming oxides upon firing (for example, $MgCO_3$) may be mentioned.

As other additives, $SiO_2$, $Al_2O_3$, and other sintering aids may be mentioned. These types of sintering aids have actions of reducing the sintering temperature. Further, they do not have much of an effect on the capacity-temperature characteristic.

Further, as other subcomponents, at least one type of oxide selected from $V_2O_5$, $MoO_3$, and $WO_3$ may be mentioned.

As still other subcomponents, Y and other rare earth element oxides may be illustrated.

The multi-layer ceramic capacitor using the dielectric ceramic composition of the present invention is suitable for use as an electronic device for equipment used at an environment of 80° C. or more, particularly 85 to 125° C. Further, in this temperature range, the capacity-temperature characteristic simultaneously satisfies the B characteristic of the EIAJ standard [rate of change of capacity of within ±10% at −25 to 85° C. (reference temperature 20° C.)] and the X7R characteristic of the EIA standard (−55 to 125° C., $\Delta C/C = \pm 15\%$ or less).

In a multi-layer ceramic capacitor, the dielectric layers are normally subjected to an AC electric field and a DC electric field superposed over this, but the temperature characteristic of the capacity is extremely stable even when such electric fields are applied.

Internal Electrode Layers 3

The electroconductive material contained in the internal electrode layers 3 is not particularly limited, but a base metal may be used since the material constituting the dielectric layers 2 has resistance to reduction. As the base metal used as the electroconductive material, Ni or a Ni alloy is preferable. As the Ni alloy, an alloy of at least one type of element selected from Mn, Cr, Co, and Al with Ni is preferable. The content of the Ni in the alloy is preferably not less than 95 wt %.

Note that the Ni or Ni alloy may contain P and other various types of trace components in amounts of not more than 0.1 wt % or so.

The thickness of the internal electrode layers may be suitably determined in accordance with the application etc., but is usually 0.5 to 5 µm, preferably 0.5 to 2.5 µm.

External Electrodes 4

The electroconductive material contained in the external electrodes 4 is not particularly limited, but in the present invention an inexpensive Ni, Cu, or alloys of the same may be used.

The thickness of the external electrodes may be suitably determined in accordance with the application etc., but is usually 10 to 100 µm or so.

Method of Manufacturing Multi-Layer Ceramic Capacitor

The multi-layer ceramic capacitor produced using the dielectric ceramic composition of the present invention is produced by preparing a green chip using the usual printing method or sheet method which uses pastes, firing the green chip, then printing or transferring and sintering the external electrodes. The method of manufacture will be explained in detail below.

The dielectric layer paste may be an organic-based coating obtained by mixing the dielectric layer ingredient and an organic vehicle and may be a water-based coating.

For the dielectric ingredient, the above oxides or their mixtures or composite oxides may be used, but it is also possible to suitably select and mix for use various compounds forming the above oxides or composite oxides after firing, for example, carbonates, oxalates, nitrates, hydroxides, and organic metal compounds. The content of these compounds in the dielectric ingredient may be determined so as to give the above composition of the dielectric ceramic composition after firing.

The dielectric ingredient is usually used in the form of a powder of an average grain size of 0.1 to 1 µm.

Note that when preparing the dielectric ingredient, the barium titanate (A) and component M are calcined, then the compound obtained at the calcination step and further barium titanate (B) are mixed to prepare the dielectric ingredient. The calcination temperature is not particularly limited, but is preferably 1000 to 1300° C., more preferably 1000 to 1100° C. If the calcination temperature is too low, DC bias voltage characteristic tends to become worse. If the temperature is too high, pulverization after calcination becomes difficult and preparation of the dielectric ingredient tends to become hard.

The molar ratio (M/A) of the component M to the barium titanate (A) is not particularly limited, but is preferably 0.0010 to 0.0120, more preferably 0.0020 to 0.0080. Furter, the molar ratio (B/A) of the later added barium titanate (B) to the pre-calcination barium titanate (A) is not particularly limited, but is preferably 0.05 to 5.00, more preferably 0.10 to 1.00. By using these molar ratios, it is possible to easily obtain a dielectric ceramic composition having a ferroelectric phase region where the concentration of the component M changes from the outside to the center and superior characteristics can be exhibited. Note that when the ratio M/A is too large, the dielectric constant tends to fall.

The organic vehicle used in the paste is comprised of a binder dissolved in an organic solvent. The binder used for the organic vehicle is not particularly limited, but may be suitably selected from ethyl cellulose, polyvinyl butyral, and other ordinary types of binders. Further, the organic solvent used is also not particularly limited and may be suitably selected from terpineol, butyl carbitol, acetone, toluene, and other organic solvents in accordance with the printing method, sheet method, or other method of use.

Further, when using a water-based coating as the dielectric layer paste, it is sufficient to knead a water-based vehicle comprised of a water-based binder or dispersant etc. dissolved in water together with the dielectric layer ingredient. The water-based binder used for the water-based vehicle is not particularly limited. For example, a polyvinyl alcohol, cellulose, water-based acrylic resin, etc. may be used.

The internal electrode layer paste is prepared by kneading the electroconductive material comprised of the above various types of electroconductive metals and alloys or various types of oxides forming the above electroconductive materials after firing, an organic metal compound, resinate, etc. together with the above organic vehicle.

The external electrode paste may be prepared in the same way as the above internal electrode layer paste.

The content of the organic vehicle in the above pastes is not particularly limited and may be within the usual content, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc. The total content of these is preferably not more than 10 wt %.

When using a printing method, the dielectric layer paste and the internal electrode layer paste are successively printed on the PET or other substrate. The result is then cut into a predetermined shape, then the pastes are peeled off from the substrate to form a green chip.

Further, when using a sheet method, a dielectric layer paste is used to form a green sheet, the internal electrode layer paste is printed on top of this, then these are stacked to form a green chip.

Before firing, the green chip is processed to remove the binder. This processing for removing the binder may be performed under ordinary conditions. If Ni or a Ni alloy or another base metal is used for the electroconductive material of the internal electrode layers, the processing is preferably performed under the following conditions:

Rate of temperature rise: 5 to 300° C./hour, in particular 10 to 100° C./hour

Holding temperature: 180 to 400° C., in particular 200 to 300° C.

Temperature holding time: 0.5 to 24 hours, in particular 5 to 20 hours

Atmosphere: in the air

The atmosphere when firing the green chip may be suitably determined in accordance with the type of the electroconductive material in the internal electrode layer paste, but when using Ni or a Ni alloy or another base metal as the electroconductive material, the oxygen partial pressure in the sintering atmosphere is preferably made $10^{-8}$ to $10^{-15}$ atmospheres. If the oxygen partial pressure is less than this range, the electroconductive material of the internal electrode layers becomes abnormally sintered and ends up breaking in the middle in some cases. Further, if the oxygen partial pressure is more than the above range, the internal electrode layers tend to oxidize.

Further, the holding temperature at the time of firing is preferably 1100 to 1400° C., more preferably 1200 to 1360° C., still more preferably 1200 to 1320° C. If the holding temperature is less than the above range, the densification becomes insufficient, while if over that range, there is a tendency toward breaking of the electrodes due to abnormal sintering of the internal electrode layers, deterioration of the capacity-temperature characteristic due to dispersion of the material comprising the internal electrode layers, and reduction of the dielectric ceramic composition.

The various conditions other than the above conditions are preferably selected from the following ranges:

Rate of temperature rise: 50 to 500° C./hour, in particular 200 to 350° C./hour

Temperature holding time: 0.5 to 8 hours, in particular 1 to 3 hours

Cooling rate: 50 to 500° C./hour, in particular 200 to 350° C./hour

Note that the sintering atmosphere is preferably a reducing atmosphere. As the atmospheric gas, for example, it is preferable to use a wet mixed gas of $N_2$ and $H_2$.

When firing in a reducing atmosphere, the capacitor device body is preferably annealed. The annealing process is for reoxidizing the dielectric layers. Since this enables the insulation resistance lifetime to be remarkably prolonged, the reliability is improved.

The oxygen partial pressure in the annealing atmosphere is preferably at least $10^{-9}$ atmospheres, particularly $10^{-6}$ to $10^{-9}$ atmospheres. If the oxygen partial pressure is less than the above range, reoxidation of the dielectric layers is difficult, while if over that range, the internal electrode layers tend to oxide.

The holding temperature at the time of annealing is preferably not more than 1100° C., in particular 500 to 1100° C. If the holding temperature is less than the above range, the oxidation of the dielectric layers becomes insufficient, so that the insulation resistance tends to become low and the insulation resistance lifetime short. On the other hand, when the holding temperature exceeds the above range, not only do the internal electrode layers oxidize and the capacity fall, but also the internal electrode layers end up reacting with the dielectric material resulting in a tendency toward deterioration of the capacity-temperature characteristic, a fall in the insulation resistance, and a fall in the insulation resistance lifetime. Note that the annealing may be comprised of only a temperature raising process and temperature reducing process. That is, the temperature holding time may also be made zero. In this case, the holding temperature is synonymous with the maximum temperature.

The various conditions other than the above conditions are preferably determined from the following ranges:

Temperature holding time: 0 to 20 hours, in particular 6 to 10 hours

Cooling rate: 50 to 500° C./hour, in particular 100 to 300° C./hour

Note that for the atmospheric gas, wet $N_2$ gas etc. may be used.

In the steps of removing the binder, the firing, and the annealing, for example, a wetter etc. may be used to wet the $N_2$ gas or mixed gas. In this case, the temperature of the water is preferably 5 to 75° C.

The steps of removing the binder, firing, and annealing may be performed consecutively or independently. When preferably performing these consecutively, after processing to remove the binder, the atmosphere is changed without cooling, then the temperature is raised to the holding temperature for firing, the firing performed, then the chip is cooled, the atmosphere is changed when the holding temperature of the annealing is reached, and then annealing is performed. On the other hand, when performing these independently, at the time of firing, preferably the temperature is raised to the holding temperature at the time of the processing for removing the binder in an $N_2$ gas or wet $N_2$ gas atmosphere, then the atmosphere is changed and the temperature is further raised. Preferably, the chip is cooled to the holding temperature of the annealing, then the atmosphere changed again to an $N_2$ gas or wet $N_2$ gas atmosphere and the cooling continued. Further, at the time of annealing, the temperature may be raised to the holding temperature in an $N_2$ gas atmosphere, then the atmosphere changed or the entire annealing process may be performed in a wet $N_2$ gas atmosphere.

The thus obtained capacitor device body is, for example, end polished using barrel polishing or sandblasting etc., then printed or transferred with an external electrode paste and fired to form the external electrodes 4. The firing conditions of the external electrode paste are for example preferably 400 to 800° C. for 10 minutes to 1 hour or so in a wet mixed gas of $N_2$ and $H_2$. Further, in accordance with need, the surfaces of the external electrodes 4 may be provided with a covering layer using a plating technique etc.

The thus produced multi-layer ceramic capacitor of the present invention is mounted by soldering it onto a printed circuit board for use in various types of electronic equipment.

Note that the present invention is not limited to the above embodiment and may be modified in various ways within the scope of the invention.

For example, in the above embodiment, the multi-layer ceramic capacitor was explained as an example of the electronic device according to the present invention, but the electronic device according to the present invention is not limited to the multi-layer ceramic capacitor. It may be any device having dielectric layers comprised of the dielectric ceramic composition of the above composition.

Below, the present invention will be explained with reference to more detailed examples, but the present invention is not limited to these examples.

EXAMPLE 1

First, 0.5 mol % of $MnCO_3$ was weighed for 100 mol % of barium titanate (A) comprised of $BaTiO_3$. These were mixed with pure water in a zirconia ball by means of a ball mill for 16 hours. Next, the mixture was dried by evaporating the moisture in a high temperature tank of 130° C. The powder obtained after the drying was calcined at 1100° C. to obtain a mixture of $BaTiO_3$ and MnO. Note that the calcination may be performed in a reducing atmosphere or even in the air.

50 mol % of later adding barium titanate (B), 2.5 mol % of $MgCO_3$, 2.5 mol % of $Y_2O_3$, 1.5 mol % of $CaCO_3$, and 4 mol % of $SiO_2$ were weighed with respect to 100 mol % of the pre-calcination barium titanate (A). These were mixed together with the calcined $BaTiO_3$ and MnO mixture with pure water in a zirconia ball by means of a ball mill for 16 hours. Next, this mixture was dried by evaporating the moisture in a high temperature tank of 130° C. to obtain the dielectric ingredient.

Note that the pre-calcination barium titanate (A) and later adding barium titanate (B) may be the same in grain size or different in grain size. The methods of manufacture may be the same or different. For example, these barium titanates may be obtained by the solid phase method, oxalate method, hydrothermal synthesis method, alkoxide method, or sol gel method. Further, the grain sizes are not particularly limited, but for example may be 0.1 to 1.0 µm.

Next, 100 wt % of the above dielectric ingredient, 4.8 wt % of acrylic resin, 40 wt % of methylene chloride, 20 wt % of ethyl acetate, 6 wt % of mineral spirit, and 4 wt % of acetone were mixed in a ball mill to form a paste and obtain the dielectric layer paste.

For the internal electrode layer paste, 44.6 wt % of nickel particles of an average grain size of 0.4 µm, 52.0 wt % of terpineol, 3 wt % of ethyl cellulose, and 0.4 wt % of benzotriazole were kneaded using a triple-roll to make a paste.

For the external electrode paste, 100 wt % of copper particles of an average grain size of 0.5 µm, 35 wt % of an organic vehicle (8 wt % of ethyl cellulose dissolved in 92 wt % of butyl carbitol), and 7 wt % of butyl carbitol were kneaded together by a triple-roll to make a paste.

The above dielectric layer paste was used to form a green sheet of a thickness of 30 µm on a PET film. The internal electrode paste was printed on this, then the green sheet was peeled from the PET film. The thus obtained green sheet was stacked and pressed to obtain a green chip. Four green sheets having the internal electrodes were stacked.

The green chip was cut to predetermined sizes which were then processed to remove the binder, fired, and annealed to obtain multi-layer ceramic sintered bodies. The size of the sintered samples was 3.2 mm×1.6 mm×0.6 mm. The thickness of the dielectric layer was about 20 µm, while the thickness of the internal electrode layer was 2 µm.

Next, the end faces of the multi-layer ceramic sintered bodies were polished by sandblasting, then the external electrode paste was transferred to the end faces and the bodies were fired in a wet nitrogen gas and hydrogen gas atmosphere at 800° C. for 10 minutes to form the external electrodes and obtain the multi-layer ceramic capacitor samples.

The processing to remove the binder was performed under the following conditions:

Rate of temperature rise: 15° C./hour
Holding temperature: 240° C.
Temperature holding time: 8 hours
Atmosphere: in the air
The firing was performed under the following conditions:
Rate of temperature rise: 300° C./hour
Holding temperature: 1275° C.
Temperature holding time: 2 hours
Cooling rate: 300° C./hour
Atmospheric gas: wet $N_2+H_2$ mixed gas
Oxygen partial pressure: $10^{-12}$ atmospheres
The annealing was performed under the following conditions:
Holding temperature: 1050° C.
Temperature holding time: 2 hours
Cooling rate: 300° C./hour
Atmospheric gas: wet $N_2$ gas
Oxygen partial pressure: $10^{-6}$ atmospheres The multi-layer ceramic capacitor samples obtained in this way were measured for relative dielectric constant (ε), dielectric loss (tanδ), and capacity-temperature characteristic. The multi-layer ceramic capacitors were measured for electrostatic capacity and dielectric loss (tanδ) under conditions of 1 kHz and 1 Vrms using an LCR meter. The relative dielectric constant (ε) was calculated from the obtained electrostatic capacity, electrode dimensions, and distance between electrodes. The results are shown in Table 1.

TABLE 1

| Sample no. | Comp. M | Comp. M/BaTiO$_3$ (A) | BaTiO$_3$ (B)/BaTiO$_3$ (A) | Calc. temp. (° C.) | ε | Temp. char. | Volt. char. (%) | tanδ (%) | IR (Ω) 100V | Judgment | Reasons |
|---|---|---|---|---|---|---|---|---|---|---|---|
| Ex. 1 | MnO | 0.0050 | 0.5 | 1100 | 2300 | G | −5 | 0.46 | 6.9E+11 | VG | |
| Ex. 2 | FeO | 0.0050 | 0.5 | 1100 | 2100 | G | −10 | 0.60 | 7.5E+11 | VG | |

TABLE 1-continued

| Sample no. | Comp. M | Comp. M/BaTiO₃ (A) | BaTiO₃ (B)/BaTiO₃ (A) | Calc. temp. (° C.) | ε | Temp. char. | Volt. char. (%) | tanδ (%) | IR (Ω) 100V | Judgment | Reasons |
|---|---|---|---|---|---|---|---|---|---|---|---|
| Ex. 3 | CoO | 0.0050 | 0.5 | 1100 | 2200 | G | −5 | 0.48 | 7.2E+11 | VG | |
| Ex. 4 | NiO | 0.0050 | 0.5 | 1100 | 2400 | G | −15 | 0.58 | 6.6E+11 | VG | |
| Ex. 5 | MnO | 0.0010 | 0.5 | 1100 | 3500 | G | −32 | 0.75 | 4.5E+11 | G | Volt. char. |
| Ex. 6 | MnO | 0.0020 | 0.5 | 1100 | 2900 | G | −25 | 0.60 | 5.5E+11 | VG | |
| Ex. 7 | MnO | 0.0120 | 0.5 | 1100 | 1800 | G | −20 | 0.43 | 8.8E+11 | VG | |
| Ex. 8 | MnO | 0.0500 | 0.5 | 1100 | 1500 | G | +5 | 0.41 | 7.0E+11 | G | ε low |
| C. Ex. 1 | MnO | 0.0013 | 0 | 1100 | 1200 | P | −10 | 0.40 | 1.3E+12 | P | Temp. char., ε low |
| C. Ex. 2 | MnO | 0.0033 | 0 | 1100 | 1100 | P | −5 | 0.35 | 1.4E+12 | P | Temp. char., ε low |
| C. Ex. 3 | MnO | 0.0080 | 0 | 1100 | 900 | P | −3 | 0.30 | 1.8E+12 | P | Temp. char., ε low |
| C. Ex. 4 | MnO | 0.0050 | 0 | 1100 | 1000 | P | −4 | 0.33 | 1.6E+12 | P | Temp. char., ε low |
| C. Ex. 5 | MnO | 0.0050 | 0.01 | 1100 | 1000 | P | −4 | 0.33 | 1.6E+12 | P | Temp. char., ε low |
| Ex. 9 | MnO | 0.0050 | 0.05 | 1100 | 1600 | G | −5 | 0.40 | 9.9E+11 | VG | |
| Ex. 10 | MnO | 0.0050 | 0.1 | 1100 | 1700 | G | −6 | 0.43 | 9.3E+11 | VG | |
| Ex. 11 | MnO | 0.0050 | 0.3 | 1100 | 1900 | G | −7 | 0.47 | 8.3E+11 | VG | |
| Ex. 12 | MnO | 0.0050 | 0.8 | 1100 | 2500 | G | −7 | 0.50 | 6.3E+11 | VG | |
| Ex. 13 | MnO | 0.0050 | 1 | 1100 | 2500 | G | −10 | 0.52 | 6.3E+11 | VG | |
| Ex. 14 | MnO | 0.0050 | 2 | 1100 | 2600 | G | −15 | 0.55 | 6.1E+11 | VG | |
| Ex. 15 | MnO | 0.0050 | 3 | 1100 | 2800 | G | −19 | 0.58 | 5.6E+11 | VG | |
| Ex. 16 | MnO | 0.0050 | 4 | 1100 | 3000 | G | −27 | 0.63 | 5.3E+11 | VG | |
| Ex. 17 | MnO | 0.0050 | 5 | 1100 | 3100 | G | −40 | 0.70 | 5.1E+11 | G | Volt. char. |
| Ex. 18 | MnO | 0.0050 | 0.5 | 900 | 2400 | G | −30 | 0.75 | 6.6E+11 | G | Volt. char. |
| Ex. 19 | MnO | 0.0050 | 0.5 | 1000 | 2400 | G | −10 | 0.63 | 6.6E+11 | VG | |
| Ex. 20 | MnO | 0.0050 | 0.5 | 1050 | 2300 | G | +5 | 0.42 | 6.9E+11 | VG | |
| Ex. 21 | MnO | 0.0050 | 0.5 | 1100 | 2300 | G | +5 | 0.46 | 6.9E+11 | VG | |
| Ex. 22 | MnO | 0.0050 | 0.5 | 1200 | 2300 | G | +5 | 0.45 | 6.9E+11 | VG | |
| Ex. 23 | MnO | 0.0050 | 0.5 | 1300 | 2300 | G | +5 | 0.49 | 6.9E+11 | VG | |
| Ex. 24 | MnO | 0.0050 | 0.5 | 1400 | 2400 | G | +5 | 0.49 | 6.6E+11 | G | Pulv. diff. after calcin. |

Figure 4A:
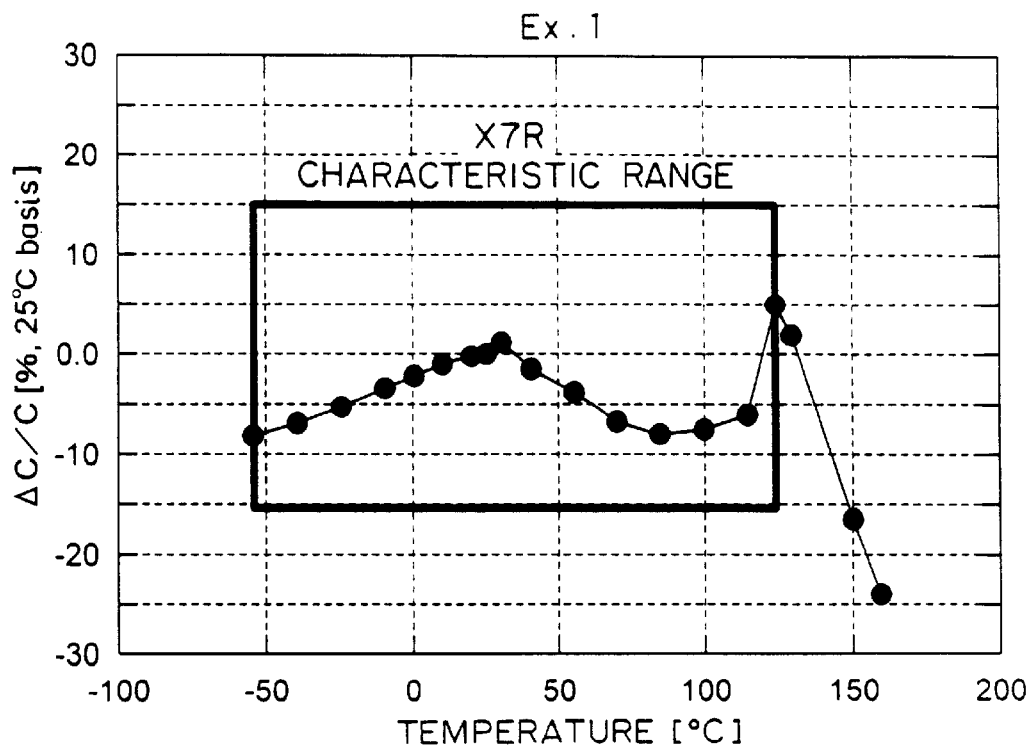
FIG. 4A and FIG. 4B are graphs of the temperature characteristic of Example 1 and Comparative Example 4 in the examples of the present invention.

For the temperature characteristic of the capacity, the multi-layer ceramic capacitor samples were measured for electrostatic capacity at a voltage of 1V for a temperature −range of −55° C. to 125° C. using the LCR meter. A rate of change of capacity using a reference temperature of 25° C. of within ±15% in the range of −55° C. to 125° C. (X7R of EIA standard) was deemed as an X7R temperature characteristic. Samples satisfying this were evaluated as "good (G)", while those not satisfying it were evaluated as "poor (P)". The results are shown in FIG. 4A and Table 1. As shown in FIG. 4A and Table 1, Example 1 was confirmed to satisfy the X7R characteristic.

Further, the capacitor samples were measured for insulation resistance (IR) at 25° C. The voltage when measuring the insulation resistance (IR) was DC 100V. The value 60 seconds after the start of application was used (unit of Ω). The results are shown in Table 1.

Figure 5A:
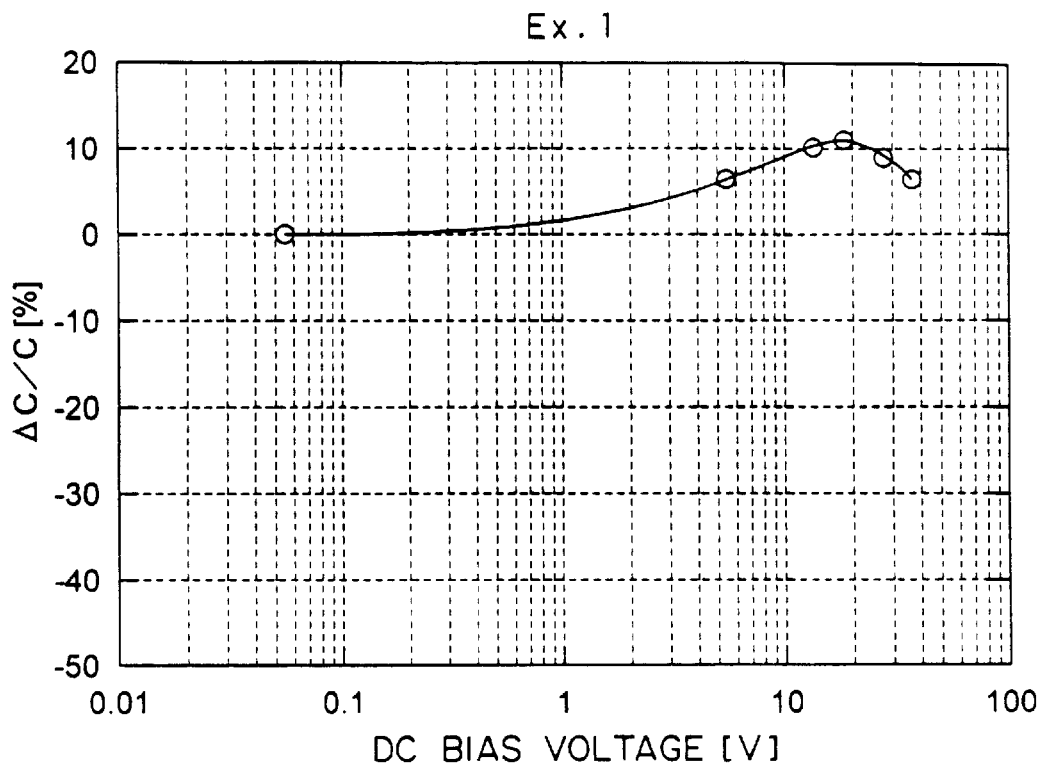
FIG. 5A and FIG. 5B are graphs of the voltage characteristics of Examples 1 and 18 in the examples of the present invention.

Further, the capacitor samples were measured for voltage characteristic. Table 1 shows as the voltage characteristic the rate of change of capacity (ΔC/C, %) when applying a DC bias voltage of 2V/μm to the capacitor samples. Further, the rate of change of capacity (ΔC/C, %) with respect to the DC bias voltage in the sample of Example 1 was graphed in FIG. 5A. Example 1 was confirmed to have a small rate of change of capacity even under a high DC voltage.

Further, the dielectric layer of a capacitor sample was photographed using a transmission electron microscope (TEM, made by Nippon Denshi, JEM-2000FXII). The results are shown in FIG. 2. In FIG. 2, six analysis points I to VI were taken from the grain boundary to the center of a crystal grain and the concentration of MnO were measured using EDS (TN5402 made by Noran Instruments). The results are shown in FIG. 3. As shown in FIG. 3, the ferroelectric phase region of Example 1 exhibits a change in concentration of MnO from the outside to the center. Further, the concentration of MnO was confirmed to rise at the outside compared with near the center of the region. Further, the ferroelectric phase region was confirmed to consist of an outside region with a distribution of concentration of MnO and an inside region not containing much MnO at all.

Note that in the results of judgment of Table 1, samples satisfying the X7R characteristic and superior in the other characteristics as well (ε, voltage characteristic, tanδ, IR) are indicated as "very good (VG)", samples satisfying the X7R characteristic but inferior in one of the other characteristic as "good (G)", and samples not satisfying the X7R characteristic as "poor (P)".

EXAMPLES 2 TO 4

The same procedure was followed as in Example 1 except, as shown in Table 1, for using FeO, CoO, or NiO instead of MnO, to prepare capacitor samples. These were tested in the same way as in Example 1. As shown in Table 1, the samples were confirmed to have similar superior characteristics as in Example 1 in the dielectric constant (ε), temperature characteristic, voltage characteristic, dielectric loss (tanδ), and insulation resistance (IR).

EXAMPLES 5 TO 8

The same procedure was followed as in Example 1 except, as shown in Table 1, for changing the molar ratio (M/A) of MnO to the pre-calcination barium titanate (A) to 0.1 mol %, 0.2 mol %, 1.2 mol %, and 5 mol %, to prepare capacitor samples. These were tested in the same way as in Example 1. As shown in Table 1, the samples were confirmed to have similar superior characteristics as in Example 1 in the dielectric constant ($\epsilon$), temperature characteristic, voltage characteristic, dielectric loss (tan$\delta$), and insulation resistance (IR). Example 5, however, was confirmed to have an inferior voltage characteristic to the other examples since the ratio of MnO was too small. Further, Example 8 was confirmed to have a low dielectric constant due to the overly large M/A.

Comparative Examples 1 to 5

The same procedure was followed as in Example 1 except, as shown in Table 1, for changing the molar ratio (M/A) of MnO to the pre-calcination barium titanate (A) and preparing the dielectric ingredients without additionally adding later adding barium titanate (B) after the calcination, to prepare capacitor samples. For just Comparative Example 5, unlike Comparative Examples 1 to 4, later adding barium titanate (B) was additionally added, but the molar ratio (B/A) of the amount added was a small 1 percent. These were tested in the same way as in Example 1.

Figure 4B:
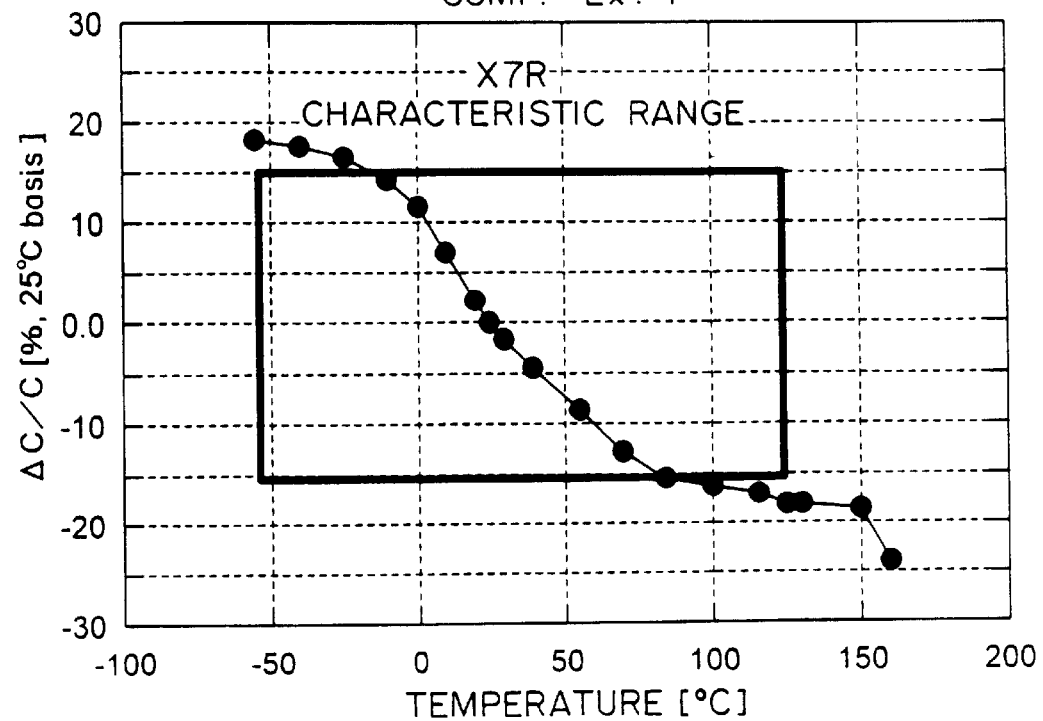

As shown in Table 1, Comparative Examples 1 to 5 were confirmed to have low dielectric constants ($\epsilon$) compared with the examples of the invention and not to satisfy the X7R characteristic (deterioration of temperature characteristic). Note that a graph of the temperature characteristic of the sample of Comparative Example 4 is shown in FIG. 4B.

Further, in the same way as in Example 1, six analysis points I to VI were taken from the grain boundary to the center of the crystal grain of each of the dielectric layers of the capacitor samples of Comparative Examples 1 to 5 and the concentrations of MnO measured. As a result, almost no change in concentration of MnO was observed from the outside to the center and the concentrations were confirmed to be substantially uniform.

EXAMPLES 9 TO 17

The same procedure was followed as in Example 1 except, as shown in Table 1, for changing the molar ratio (B/A) of later adding barium titanate (B) to the pre-calcination barium titanate (A), to prepare capacitor samples. These were tested in the same way as in Example 1.

As shown in Table 1, the samples were confirmed to have similar superior characteristics as in Example 1 in the dielectric constant ($\epsilon$), temperature characteristic, voltage characteristic, dielectric loss (tan$\delta$), and insulation resistance (IR). Example 17, however, was confirmed to have an inferior voltage characteristic to the other examples since the molar ratio B/A was too large.

EXAMPLES 18 TO 24

The same procedure was followed as in Example 1 except, as shown in Table 1, for changing the calcination temperature, to prepare capacitor samples. These were tested in the same way as in Example 1.

Figure 5B:
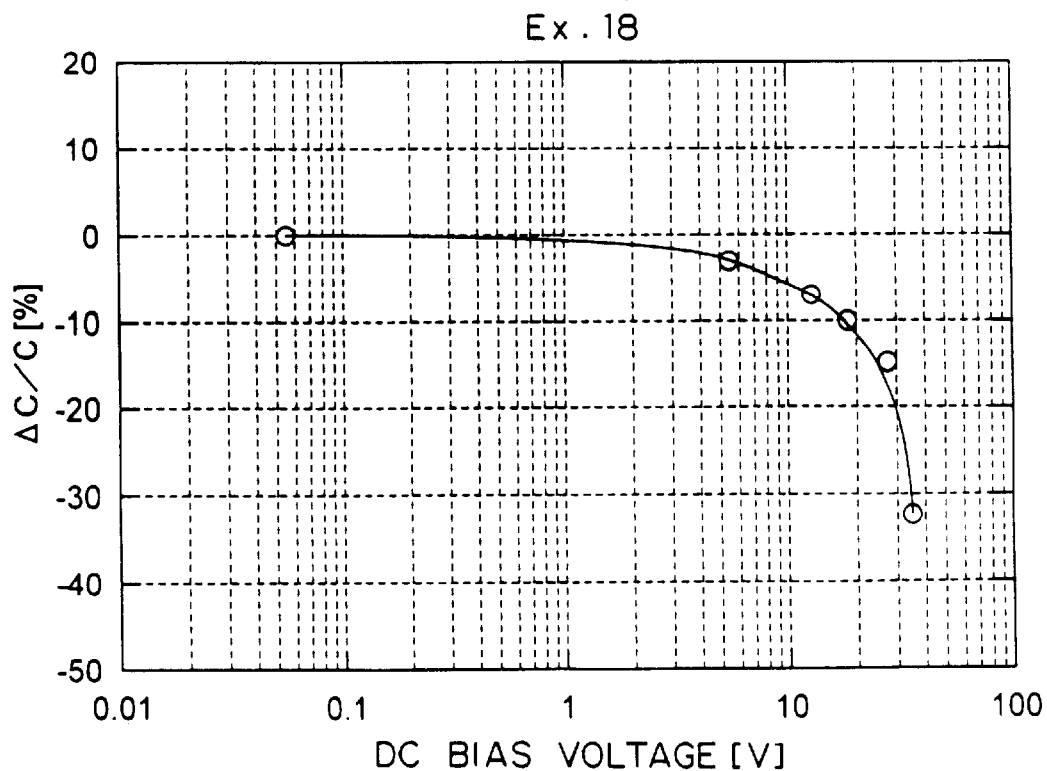

As shown in Table 1, the samples were confirmed to have similar superior characteristics as in Example 1 in the dielectric constant ($\epsilon$), temperature characteristic, voltage characteristic, dielectric loss (tan$\delta$), and insulation resistance (IR). Example 18, however, was confirmed to have an inferior voltage characteristic to the other examples since the calcination temperature was too low. The voltage characteristic of the sample in Example 18 is shown in FIG. 5B. Further, Example 24 was hard to pulverize after calcination.

As explained above, according to the present invention, it is possible to provide an electronic device such as a multilayer capacitor which can satisfy both of the X7R characteristic (EIA standard) and B characteristic (EIAJ standard) of the temperature characteristic of the electrostatic capacity, has little voltage dependency of the electrostatic capacity and the insulation resistance, is superior in insulation breakdown resistance, and can use Ni or a Ni alloy as the internal electrode layer, a dielectric ceramic composition suitable for use as the dielectric layer of such an electronic device, and a method of producing the same.

What is claimed is:

1. A dielectric ceramic composition comprising as main components barium titanate and a component M, wherein M is at least one type of component selected from manganese oxide, iron oxide, cobalt oxide, and nickel oxide and having a ferroelectric phase region, wherein the concentration of the component M in the ferroelectric phase region changes from the outside toward the center thereof.

2. The dielectric ceramic composition as set forth in claim 1, wherein the concentration of the component M in the ferroelectric phase region is higher at the outside compared with near the center of the ferroelectric phase region.

3. The dielectric ceramin composition as set forth in claim 2, wherein there is a diffusion phase region outside of the ferroelectric phase region.

4. The dielectric ceramic composition as set forth in claim 1, wherein the ferroelectric phase region is comprised of an outside ferroelectric phase region and an inside ferroelectric phase region and has a higher concentration of the component M in the outside ferroelectric phase region that the inside ferroelectric phase region.

5. The dielectric ceramic composition as set forth in claim 4, wherein there is a diffusion phase region outside of the ferroelectric phase region.

6. The dielectric ceramic composition as set forth in claim 4, wherein the inside ferroelectric phase region does not contain almost any of the component M.

7. The dielectric ceramic composition as set forth in claim 6, wherein there is a diffusion phase region outside of the ferroelectric phase region.

8. The dielectric ceramic composition as set forth in claim 1, wherein there is a diffusion phase region outside of the ferroelectric phase region.

9. A method of producing a dielectric ceramic composition comprising the steps of;

calcining barium titanate (A) and an ingredient of a component M, where M is at least one type of component selected from a manganese oxide, iron oxide, cobalt oxide, and nickel oxide, and firing a mixture of the compound obtained in the calcination step and other barium titanate (B).

10. The method of producing a dielectric ceramic composition as set forth in claim 9, wherein the temperature at the calcination is 1000 to 1300° C.

11. The method of producing a dielectric ceramic composition as set forth in claim 10, wherein the molar ratio (M/A) of the component M to the pre-calcination barium titanate (A) is 0.0010 to 0.0120.

12. The method of producing a dielectric ceramic composition as set forth in claim 11, where the molar ration (B/A) of the later adding barium titanate (B) to the pre-calcination barium titanate (A) is 0.05 to 5.00

13. The method of producing a dielectric ceramic composition as set forth in claim 10, wherein the firing is performed under a reducing atmosphere.

14. The method of producing a dielectric ceramic composition as set forth in claim 9, wherein the firing is performed under a reducing atmosphere.

15. The method of producing a dielectric ceramic composition as set forth in claim 14, wherein the molar ratio (M/A) of the component M to the pre-calcination barium titanate (A) is 0.0010 to 0.0120.

16. The method of producing a dielectric ceramic composition as set forth in claim 15, wherein the molar ratio (B/A) of the later adding barium titanate (B) to the pre-calcination barium titanate (A) is 0.05 to 5.00.

17. The method of producing a dielectric ceramic composition as set forth in claim 9, wherein the molar ratio (M/A) of the component M to the pre-calcination barium titanate (A) is 0.0010 to 0.0120.

18. The method of producing a dielectric ceramic composition as set forth in claim 17, wherein the molar ratio (B/A) of the later adding barium titanate (B) to the pre-calcination barium titanate (A) is 0.05 to 5.00.

19. An electronic device having a dielectric layer, wherein the dielectric layer comprises of a dielectric ceramic composition comprising as main components barium titanate and a component M, wherein M is at least one type of component selected from manganese oxide, iron oxide, cobalt oxide, and nickel oxide, and having a ferroelectric phase region and the concentration of the component M in the ferroelectric phase region changes from the outside toward the center thereof.

20. The electronic device as set forth in claim 19, further comprising an internal electrode layer including nickel or a nickel alloy.

* * * * *